United States Patent [19]
George

[11] 3,790,032
[45] Feb. 5, 1974

[54] PARTY KEG BEER DISPENSER APPARATUS

[75] Inventor: Darell L. George, Midland, Tex.

[73] Assignee: J. W. Henry, Odessa, Tex.

[22] Filed: Mar. 6, 1972

[21] Appl. No.: 232,172

[52] U.S. Cl. .............................................. 222/146
[51] Int. Cl. ............................................ B67d 1/04
[58] Field of Search.... 222/146 C, 146 R, 108, 183; 220/13; 260/2.5 E

[56] References Cited
UNITED STATES PATENTS

| | | | |
|---|---|---|---|
| 2,256,483 | 9/1941 | Johnston | 260/2.5 E |
| 606,074 | 6/1898 | Oakley | 222/146 C X |
| 2,792,692 | 5/1957 | Bryan | 62/306 |
| 2,262,043 | 11/1941 | Perlick | 222/146 C X |
| 1,772,111 | 8/1930 | Rice | 222/146 C X |
| 1,586,745 | 6/1926 | Hulse | 222/146 C X |
| 150,830 | 5/1974 | Collier | 222/146 C X |
| 1,009,437 | 11/1911 | Patnaude | 222/146 C X |
| 1,248,705 | 12/1917 | Pogye | 222/146 C X |
| 1,377,630 | 5/1921 | Royster | 222/108 |

FOREIGN PATENTS OR APPLICATIONS
10,367   5/1901   Norway ........................... 222/146 C Primary Examiner—Stanley H. Tollberg
Assistant Examiner—Norman L. Stack, Jr.
Attorney, Agent, or Firm—Marcus L. Bates

[57] ABSTRACT

Party keg apparatus for cooling, housing, and dispensing draft or keg beer comprising a hollow main body within which a beer keg and ice may be housed so as to cool a considerable quantity of kegged beer. A removable tower structure has a platform included therewith which forms a closure member for the main body. The tower forms a chamber and also provides support means for a valve outlet which is disposed in overhanging relationship relative to a drain located in the platform.

A baffle plate located at the lower extremity of the interior of the tower enables a quantity of ice to be stored therewithin and about a flow line which flow connects the valve to the beer keg.

1 Claim, 4 Drawing Figures

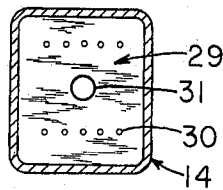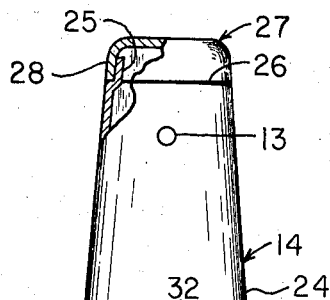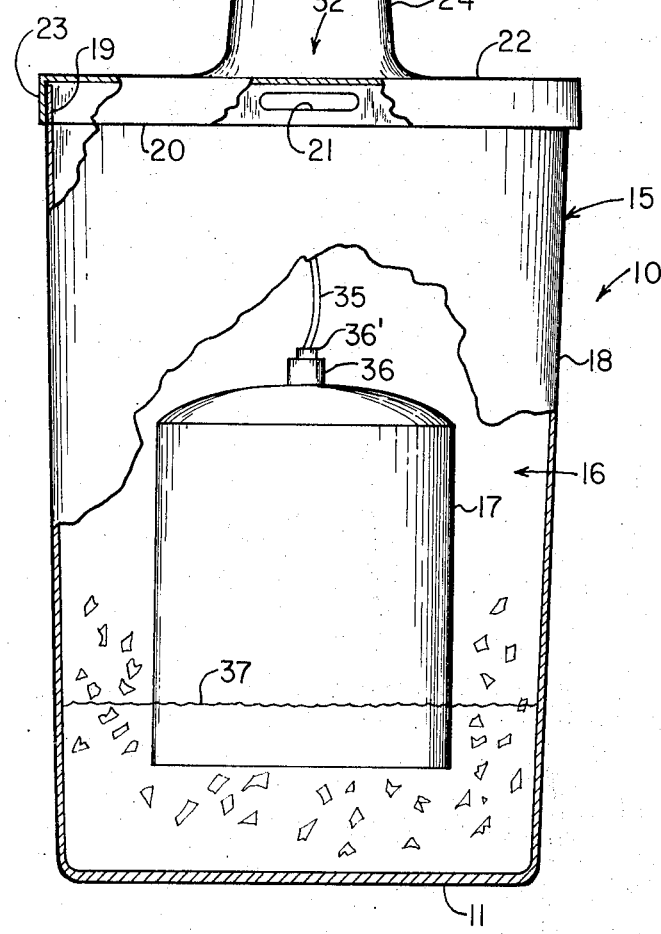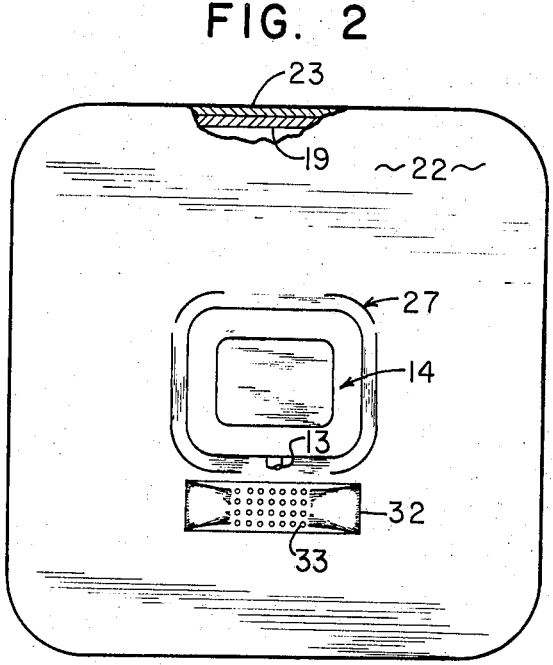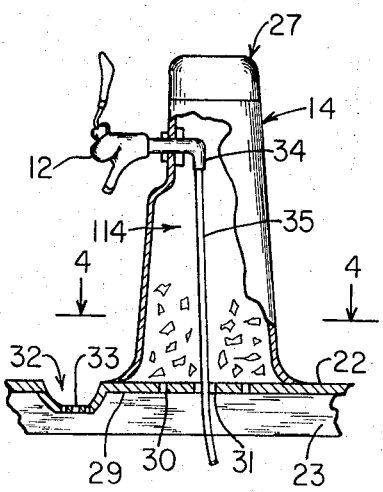

PARTY KEG BEER DISPENSER APPARATUS

BACKGROUND OF THE INVENTION

Draft beer must come from a beer keg if it is to be truly representative of its name. There is a psychological difference between draft beer which one personally dispenses from a beer keg cooler apparatus and draft beer which one simply pours from an ordinary beer bottle. The most successful gathering now-a-days usually attributes its success to the presence of true draft beer which is dispensed from a beer keg. True draft beer is available in one-half or one-fourth barrel kegs, furnished upon request by the local beer distributor. The advantages of draft beer are: comparatively low cost, excellent brew, and induced self service. The usual disadvantages are: waste, a smelly wet floor, and usually an unsightly cooler for housing the keg.

Modern beer kegs are made of aluminum and are hygenic, are easily cooled because of the high thermal conductivity of the container, and will protect beer for a long period of time if it is maintained at the proper storage temperature.

It is desirable to provide a party keg for containing a keg of draft beer which is attractive in appearance, low in cost, convenient to use, and which overcomes all of the above disadvantages while at the same time takes advantage of the above several desirable attributes.

SUMMARY OF THE INVENTION

The present invention comprehends a party keg apparatus for cooling, housing, and dispensing beer comprising an upwardly opening main body having a terminal end portion defined by a first flange member and which forms an enclosure for housing a keg of beer and a supply of ice therein. Superimposed upon the main body is a closure member in the form of a platform having a marginal edge portion in the form of a flange which removably engages the first recited flange member.

A chamber forming tower upwardly extends from the platform and provides an enclosure into which crushed ice may be placed. A valve means is affixed to the tower and includes a flow conduit which is flow connected to a beer keg located within the main body.

Baffle means located interiorly of the tower provides a means by which the valve and flow conduit are maintained at a low temperature. The platform is provided with a drain means located in underlying relationship respective of the outlet of the valve.

Accordingly, an object of this invention is the provision of party keg apparatus for cooling, housing, and dispensing beer in a new and different manner.

Another object of the invention is to provide improvements in party keg apparatus which is more pleasing in appearance and promotes cleanliness of the dispensing operation.

A further object of this invention is to disclose and provide a means for housing and cooling a keg of beer which is efficient in operation, low in cost, attractive in appearance, and which can be assembled and operated by unskilled persons.

A still further object of this invention is to provide party keg apparatus for cooling, housing, and dispensing beer which eliminates waste and which returns spilled beer into the container body.

Another and still further object of this invention is to provide a beer dispensing apparatus which reduces the amount of foam occasioned by the filling of a beer mug from a keg of beer.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 1 is a side elevational view which discloses a party keg apparatus made in accordance with the present invention with some parts thereof being broken away and some of the remaining parts thereof being shown in section;

FIG. 2 is a top plan view of the apparatus disclosed in FIG. 1, with some parts thereof being broken away and some of the remaining parts thereof being shown in section;

FIG. 3 is a fragmentary part cross-sectional view of part of the apparatus disclosed in FIGS. 1 and 2; and FIG. 4 is a cross-sectional view taken along line 4—4 of FIG. 3.

DETAILED DESCRIPTION OF THE PREFERRED EMBODIMENT

In FIG. 1, the arrow at numeral 10 broadly illustrates a party keg beer dispenser apparatus which has been fabricated in accordance with the present invention. The apparatus includes a main body having a base 11 which bottom supports the entire assembly.

As disclosed in FIGS. 1–3, a valve 12, such as in an ordinary hand actuated draft beer dispenser valve known to those skilled in the art, is provided with an inlet at 13 which extends into a hollow tower 14. Upwardly and outwardly sloped wall 15 can be square, rectangular, round, or elliptical in cross-sectional configuration although it is preferred that the geometrical configuration of the main body be in the form of a square so as to facilitate storage of the assembled apparatus.

The main body forms an enclosure 16 for housing a keg of beer 17 therein. The outwardly sloped wall 18 terminates in a vertically disposed upper marginal peripherally extending edge portion which forms a continuous flange member at 19. Diametrically opposed hand holds 21 facilitate handling the main body member when the tower is removed therefrom.

A horizontally disposed platform 22, having a downwardly directed vertically disposed skirt member 23, forms a continuous flange member which cooperates with the before mentioned flange member of the main body in the illustrated manner of FIGS. 1 and 2. The members 19 and 23 preferably are slidably telescoped together in close tolerance relationship so as to preclude leakage of air therethrough.

A chamber forming tower 24 upwardly extends from the platform and is reduced in diameter at 25. Interface 26 forms the lower edge portion of closure member or cap 27 which includes a circumferentially extending downwardly directed skirt member 28 which slidably cooperates in a removable manner with the reduced diameter portion.

A perforated baffle 29 is supported within the tower and disposed adjacent to the platform for supporting a supply of ice within the chamber while enabling water to drain from the chamber into the main body by means of perforations 30. Centrally located aperture 31 is provided within the baffle for a purpose which will be better understood later on in this disclosure.

Formed within the platform in underlying relationship relative to the illustrated outlet of the valve is an elongated rectangular drain means 32 having apertures 33 provided therein so that excess fluid from the valve as well as overflow spillage from beer mugs will be returned into the main body.

Flow connection 34 is attached to a plastic flow conduit 35 with the flow conduit extending through the chamber 114 of the tower, through the before mentioned aperture 31, and includes an end portion 36' which is flow connected to a fitting 36 of the beer keg.

As illustrated in FIG. 1, as the ice surrounding the beer keg melts, the liquid therefrom forms a water line which is arbitrarily indicated at 37.

It will be noted that a plurality of the main body members as well as a plurality of the towers may be stacked in telescoping fashion relative to one another thereby conserving a substantial amount of storage room. Moreover, the square configuration of the main body enables a maximum number of assembled units to occupy a given space.

OPERATION

In operation, when the draft beer is ordered from the distributor, a full keg is placed within the main body, ice is added to chamber 16, connection 36' effected, and the tower affixed to the main body by slidably mating flanges 19 and 23. Cap 27 is then removed and the tower completely filled with crushed ice after which the cap is returned to the proper closed position. The beer will be maintained at its optimum consumable temperature for a considerable length of time because of the low conductivity of the plastic material from which the apparatus is fabricated.

As beer is dispensed from the keg by means of valve 12, it flows through the metal portions of the valve assembly at 34 as well as through the flexible plastic conduit 35, thereby maintaining the fluid at a reduced temperature. Accordingly, the beer will enter a beer mug with a minimum of foaming because the outlet portions of the flow system of the beer supply will not subject the beer to a sudden rise in temperature.

Should a beer mug be overfilled, the spillage therefrom will flow into the drain 32, through the apertures thereof, and back into the interior of the main body where it admixes with the ice and water.

The apparatus can be made of metal, plastic, and other plastic-like materials, although it is preferably fabricated of inexpensive foamed plastic having low thermal conductivity which will maintain the beer keg at a low temperature for an extended length of time. Foamed plastic, such as nitrogen injected polyethylene, provides a monocoque structure of superior strength and appearance. The apparatus is easily disassembled for cleaning and may be stored for subsequent use.

I claim:

1. A party keg apparatus for cooling, housing, and dispensing beer comprising an upwardly opening main body having a terminal end portion defined by a first flange member; said main body forming an enclosure for housing a keg of beer and a supply of ice therein;

a closure member in the form of a platform, said closure member having a marginal edge portion in the form of a flange which removably engages said first flange member;

a chamber forming tower upwardly extending from said platform, said tower being centrally located respective to said platform so that a marginal portion of the platform is circumferentially disposed about the base of the tower; an ice charging inlet formed at the upper extremity of said tower; closure means for said inlet; a valve means having an inlet and an outlet, said valve means being affixed to said tower with said valve inlet being located within and said valve outlet being located without said tower; a downward sloped drain means formed within said platform, said drain means being flow connected to the interior of said main body and underlying said valve outlet and spaced from said tower and from said flange;

a perforated baffle, an aperture formed within said baffle, said baffle being located within said tower and being an integral part of said platform for supporting a supply of ice within said chamber while enabling water to frain from said chamber into said main body;

a flexible resilient flow conduit means received through said aperture and flow connected to said inlet and adapted to be flow connected to a keg of beer which may be located in said main body so as to enable beer, which is located in the keg to flow through said flow conduit means and through said valve means; and said perforated baffle, said tower, said platform, and said flange are of integrally molded plastic structure.

* * * * *

UNITED STATES PATENT OFFICE
CERTIFICATE OF CORRECTION

Patent No. 3,790,032    Dated February 5, 1974

Inventor(s) Darrell L. George

It is certified that error appears in the above-identified patent and that said Letters Patent are hereby corrected as shown below:

Claim 1, line 41, change "frain" to -- drain -- .

Signed and sealed this 16th day of July 1974.

(SEAL)
Attest:

McCOY M. GIBSON, JR.
Attesting Officer

C. MARSHALL DANN
Commissioner of Patents